(12) United States Patent
Tsuji et al.

(10) Patent No.: US 7,504,790 B2
(45) Date of Patent: Mar. 17, 2009

(54) CONTROL SYSTEM FOR MULTIPHASE ROTARY ELECTRIC MACHINES

(75) Inventors: Hiroya Tsuji, Yokkaichi (JP); Takahiro Yamada, Nagoya (JP); Tomonori Kimura, Oobu (JP)

(73) Assignee: Denso Corporation, Kariya (JP)

( * ) Notice: Subject to any disclaimer, the term of this patent is extended or adjusted under 35 U.S.C. 154(b) by 169 days.

(21) Appl. No.: 11/730,464

(22) Filed: Apr. 2, 2007

(65) Prior Publication Data

US 2007/0229010 A1 Oct. 4, 2007

(30) Foreign Application Priority Data

Apr. 3, 2006 (JP) ............................. 2006-101325

(51) Int. Cl.
*H02P 7/00* (2006.01)
(52) U.S. Cl. ..................... 318/432; 318/461; 318/474
(58) Field of Classification Search ................. 318/461, 318/466, 474, 801, 432
See application file for complete search history.

(56) References Cited

U.S. PATENT DOCUMENTS

2006/0055352 A1 * 3/2006 Mori et al. .................. 318/432

2006/0214623 A1 9/2006 Yamada

FOREIGN PATENT DOCUMENTS

JP 7-111777 4/1995
JP 2006-280055 10/2006

* cited by examiner

*Primary Examiner*—Karen Masih
(74) *Attorney, Agent, or Firm*—Nixon & Vanderhye PC

(57) ABSTRACT

In a control system, a storing unit has stored a relationship between a workload associated with rotation of a multiphase rotary electric machine and a voltage utilization factor of the multiphase rotary electric machine. The voltage utilization factor includes information representing how percentage the direct current voltage applied to a switching element is used by the multiphase rotary electric machine. A measuring unit measures change in the workload associated with rotation of the multiphase rotary electric machine. A pulse control unit carries out a single pulse control to change an on duration of the switching element to be substantially equivalent to a half cycle of a cyclic current while continuously changing the voltage utilization factor based on the relationship stored in the storing unit and the measured change of the workload.

10 Claims, 6 Drawing Sheets

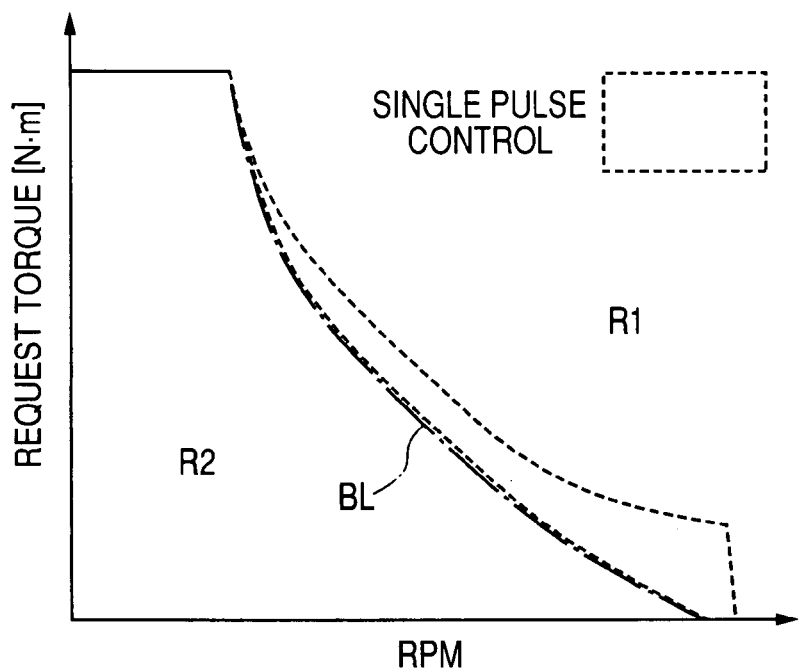
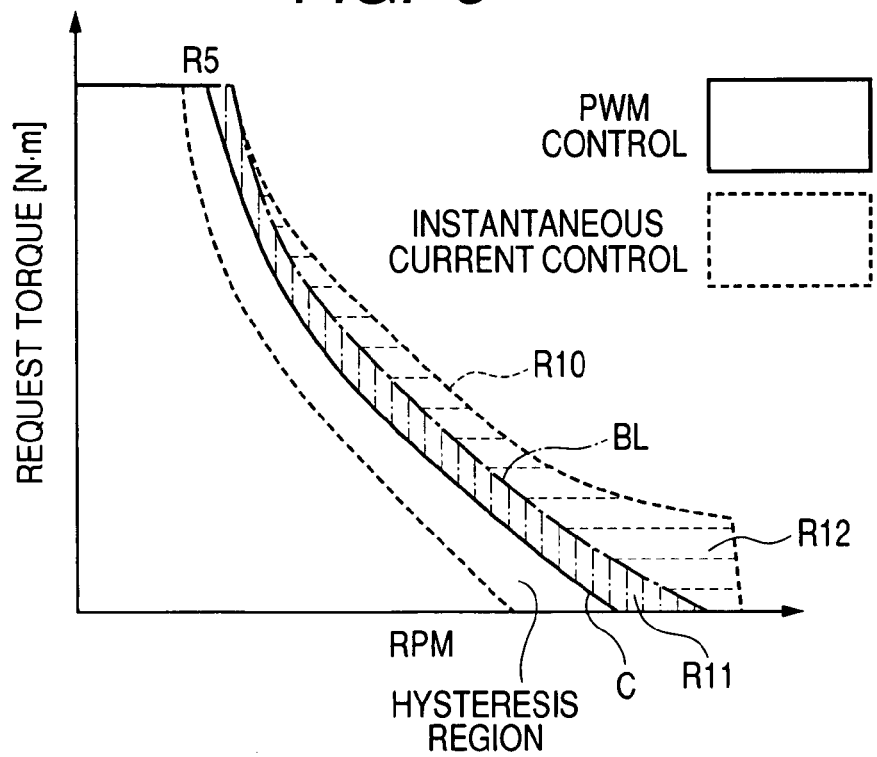

CONTROL SYSTEM FOR MULTIPHASE ROTARY ELECTRIC MACHINES

CROSS REFERENCE TO RELATED APPLICATIONS

This application is based on Japanese Patent Application 2006-101325 filed on Apr. 3, 2006. This application claims the benefit of priority from the Japanese Patent Application, so that the descriptions of which are all incorporated herein by reference.

FIELD OF THE INVENTION

The present invention relates to control systems for multiphase rotary electric machines, which are capable of smoothly switching a current control mode of an inverter to a single pulse mode.

BACKGROUND OF THE INVENTION

An example of various types of control units for a multiphase rotary electric machine is configured to carry out PWM (Pulse Width Modulation) control. Specifically, during the PWM control, the control unit compares a request current wave required to output a request torque with a carrier triangle wave, and generates a plurality of voltage pulses in every cycle of the request current wave based on the comparison result. These voltage pulses allow switching elements of an inverter in a bridge configuration to be turned on and off, thereby generating an output sinusoidal current corresponding to the request current wave.

The PWM control of the inverter however increases power loss during high output torque and/or high revolutions of the multiphase rotary electric machine because of switching losses of the switching elements. For this reason, during high output torque and/or high revolutions of the multiphase rotary electric machine, the control unit can carry out single pulse control.

Specifically, during the single pulse control, the control unit generates a single voltage pulse in every half cycle of the request current wave to be applied to each of the switching elements, and controls the generated single voltage pulse in phase depending on a rotational phase of the rotor of the multiphase rotary electric machine.

The single pulse control of the inverter can not only prevent an increase in power loss during high output torque and/or high revolutions of the multiphase rotary electric machine but also improve the voltage utilization factor of the multiphase rotary electric machine. Note that the voltage utilization factor can be calculated by dividing an RMS value of a line-to-line voltage of the multiphase rotary electric machine by an input voltage of the inverter.

Note that, as another method for effectively addressing an increase in power loss during high output torque and/or high revolutions of a multiphase rotary electric machine, Japanese Unexamined Patent Publication H07-111777 discloses a method of controlling an instantaneous one phase current based on a delay time thereof.

SUMMARY OF THE INVENTION

The inventors of this application have founded that an output torque of a multiphase rotary electric machine is suddenly changed depending on a sudden change in an output current of an inverter when the control mode of a control unit of the machine is shifted from the PWM control mode to the single pulse control mode. When the multiphase rotary electric machine is installed in a vehicle, such as a hybrid vehicle, the sudden change of the output torque of the machine may cause at least one occupant to be subjected to a shock (torque shock).

Accordingly, an object of at least one aspect of the present invention is to prevent torque shock from occurring due to an intermittent change of an output torque of a multiphase rotary electric machine.

According to one aspect of the present invention, there is provided a control system for controlling an on duration of a switching element to which a direct current voltage is applied, thereby generating a cyclic current to be supplied to a multiphase rotary electric machine. The cyclic current allows a portion of the multiphase rotary electric machine to rotate. The control system includes a storing unit configured to store a relationship between a workload associated with rotation of the portion of the multiphase rotary electric machine and a voltage utilization factor of the multiphase rotary electric machine. The voltage utilization factor includes information representing how percentage the direct current voltage applied to the switching element is used by the multiphase rotary electric machine. The control system includes a measuring unit configured to measure change in the workload associated with rotation of the multiphase rotary electric machine. The control system includes a pulse control unit configured to carry out a single pulse control to change the on duration of the switching element to be substantially equivalent to a half cycle of the cyclic current while continuously changing the voltage utilization factor based on the relationship stored in the storing unit and the measured change of the workload.

According to another aspect of the present invention, there is provided a control system for controlling an on duration of a switching element to which a direct current voltage is applied, thereby generating a cyclic current to be supplied to a multiphase rotary electric machine. The cyclic current allows a portion of the multiphase rotary electric machine to rotate. The control system includes a storing unit configured to store a relationship between a workload associated with rotation of the multiphase rotary electric machine and a voltage utilization factor of the multiphase rotary electric machine. The voltage utilization factor includes information representing how percentage the direct current voltage applied to the switching element is used by the multiphase rotary electric machine. The control system includes a measuring unit configured to measure change in the workload associated with rotation of the portion of the multiphase rotary electric machine. The control system includes a setting unit configured to set a first command current value for the cyclic current, and a measuring unit configured to measure an instantaneous current value based on the cyclic current flowing in the multiphase rotary electric machine. The control system includes an instantaneous control unit. The instantaneous control unit is configured to carry out a multi-pulse control to generate a plurality of drive pulses based on a difference between the first command current value and the measured instantaneous current value within one cycle of the cyclic current. Each of the drive pulses allows the switching element to be turned on. The control system includes a PWM control unit configured to carry out a PWM control to compare a signal wave with a predetermined carrier wave. The signal wave is required to control the cyclic current to be set to the command current value. The PWM control unit is configured to generate a plurality of drive pulses based on a comparison result of the signal wave and the carrier wave within one cycle of the cyclic current. Each of the drive pulses allows the switching element to be turned on. The control system includes a switching unit operatively connected to the instantaneous control unit and the PWM control unit and configured to, when the measured workload is equal to or more than a predetermined value during execution of the PWM control by the PWM control unit, switch from the PWM control to the multi-pulse control.

BRIEF DESCRIPTION OF THE DRAWINGS

Other objects and aspects of the invention will become apparent from the following description of embodiments with reference to the accompanying drawings in which:

FIG. 4 is a graph schematically illustrating a relationship between an RPM of a motor-generator and a variable request torque according to the embodiment;

FIG. 5 is a graph schematically illustrating a relationship between a RPM of the motor-generator and a variable request torque obtained by shifting a PWM control to an instantaneous current control at a proper timing according to the embodiment;

DETAILED DESCRIPTION OF EMBODIMENTS OF THE INVENTION

An embodiment of the present invention will be described hereinafter with reference to the accompanying drawings. In the embodiment, the present invention is, for example, applied to a control system for a three-phase rotary electric machine installed in a hybrid vehicle; this three-phase motor-generator is an example of various types of multiphase rotary electric machines.

Figure 1:
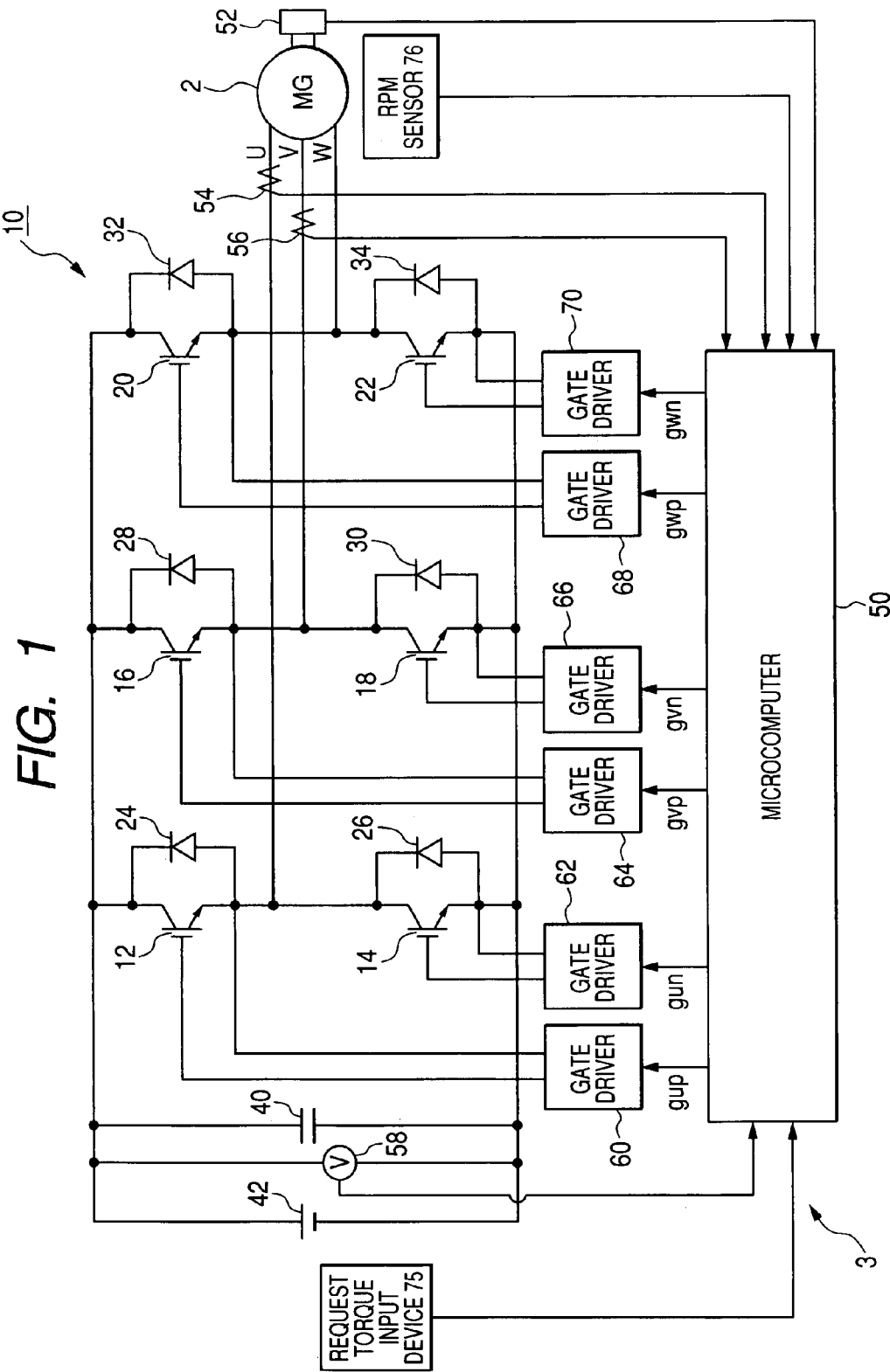
FIG. 1 is a circuit diagram of a control system according to an embodiment of the present invention.

Referring to the drawings, in which like reference characters refer to like parts in several figures, particularly to FIG. 1, there is illustrated a three-phase motor-generator, referred to simply as "motor-generator (MG)" 2 and a control system 3 for controlling the motor-generator 2.

For example, the motor-generator 2 is provided with an annular rotor whose rotor core is fixedly fitted around the outer periphery of a crankshaft of an engine installed in the hybrid vehicle. The rotor includes a rotor core. The rotor core is fixedly fitted around the outer periphery of a rotating shaft.

The rotor core of the rotor is provided at its circumferential portion with poles (N and S poles) arranged at given intervals. The rotor has a direct axis (D-axis) in line with a rotor N pole center line, and has a quadrature axis (Q-axis) whose phase is $\pi/2$ radian electric angle leading with respect to a corresponding D-axis during rotation of the rotor.

The stator includes a stator core with, for example, an annular shape in its lateral cross section. The stator core is disposed around the outer periphery of the rotor core such that the inner periphery of the stator core is opposite to the outer periphery of the rotor core with a predetermined air gap.

The stator core also has a plurality of slots. The slots are formed through the stator core and are circumferentially arranged at given intervals. The stator also includes a set of three-phase windings wound in the slots of the stator.

The three-phase windings are wound in the slots such that the U-, V-, and W-phase windings are shifted by an electric angle of, for example, $2\pi/3$ radian in phase from each other.

One ends of the U-, V-, and W-phase windings are connected to each other in, for example, star configuration to constitute an individual neutral point.

On the other hand, the control system 3 includes an inverter 10.

The inverter 10 is designed as a three-phase inverter. The inverter 10 is composed of a first pair of series-connected switching elements 12 and 14, a second pair of series-connected switching elements 16 and 18, and a third pair of series-connected switching elements 20 and 22. The inverter 10 is also composed of flywheel diodes 24, 26, 28, 30, 32, and 34 parallely connected to the switching elements 12, 14, 16, 18, 20, and 22, respectively.

In the embodiment, for example, as the switching elements 12, 14, 16, 18, and 20, IGBTs (Insulated Gate Bipolar Transistors) are respectively used. The cathode of each of the flywheel diodes 24, 26, 28, 30, 32, and 34 is connected to the drain of one of the switching elements (IGBTs), and the anode thereof is connected to the source of a corresponding one of the switching elements.

The first to third pairs of switching elements are parallely connected to each other in half-bridge configuration.

A connecting point through which the switching elements 12 and 14 of the first pair are connected to each other in series is connected to an output lead extending from the other end of the U-phase winding. Similarly, a connecting point through which the switching elements 16 and 18 of the second pair are connected to each other in series is connected to an output lead extending from the other end of the V-phase winding. Moreover, a connecting point through which the switching elements 20 and 22 of the third pair are connected to each other in series is connected to an output lead extending from the other end of the W-phase winding.

The control system 3 includes a smoothing capacitor 40 and a battery 42.

One end of the series-connected switching elements 12 and 14 of the first pair, such as the drain of the switching element 12 is connected to a positive terminal of the battery 42, and the other end thereof, such as the source of the second switching element 14, is connected to a negative terminal of the battery 42.

Similarly, one end of the series-connected switching elements 16 and 18 of the second pair is connected to the positive terminal of the battery 42, and the other end thereof is connected to the negative terminal of the battery 42. Moreover, one end of the series-connected switching elements 20 and 22 of the third pair is connected to the positive terminal of the battery 42, and the other end thereof is connected to the negative terminal of the battery 42.

In other words, the battery 42 is parallely connected to the first, second, and third pairs of switching elements, and the smoothing capacitor 40 is parallely connected to the battery 42.

This connecting configuration between the inverter 10 and the battery 42 allows an output voltage VH of the battery 42 to be applied, via the smoothing capacitor 40, across both ends of the first paired series-connected switching elements 12 and 14, both ends of the second paired series-connected switching elements 16 and 18, and both ends of the third paired series-connected switching elements 20 and 22.

The control system 3 includes a rotational position sensor 52, first and second current sensors 54 and 56, and a voltage sensor 58. In addition, the control system 3 includes a first pair of gate drivers 60 and 62, a second pair of gate drivers 64 and 66, a third pair of gate drivers 68 and 70, and a microcomputer 50. The microcomputer 50 is designed as a normal computer circuit consisting essentially of, for example, a CPU, an I/O interface, and a memory unit.

The rotational position sensor 52 is arranged close to the rotor of the motor-generator 2 and is operative to measure an actual rotational position (rotational angle) θ of the d-axis of the rotor with respect to a stator coordinate system fixed in space which characterizes the three-phase windings of the stator. The rotational position sensor 52 is connected to the microcomputer 50 and operative to send, to the microcomputer 50, the measured actual rotation angle of the rotor as one of motor state variables.

The first current sensor 54 is arranged to allow measurement of an instantaneous U-phase alternating current flowing through the U-phase winding of the stator. Similarly, the second current sensor 56 is arranged to allow measurement of an instantaneous V-phase alternating current flowing through the V-phase winding of the stator. The first and second current sensors 54 and 56 are connected to the microcomputer 50.

Specifically, the first and second current sensors 54 and 56 are operative to send, to the microcomputer 50, the instantaneous value of each of the U- and V-phase alternating currents as some of the motor state variables.

The voltage sensor 58 is arranged to allow measurement of the output voltage of the battery 42 to be applied across each of the pairs of series-connected switching elements. The voltage sensor 58 is connected to the microcomputer 50. The voltage sensor 58 is operative to send, to the microcomputer 50, an actual value of the voltage (DC voltage) to be applied across each of the pairs of series-connected switching elements as one of the motor state variables.

The microcomputer 50 is connected to a request torque input device 75 installed in the hybrid vehicle. The request torque input device 75 is operative to input, to the microcomputer 50, a commanded torque (request torque) of a user, such as an acceleration command of the user.

For example, an accelerator position sensor installed in the hybrid vehicle can be used as the request torque input device 75. Specifically, the accelerator position sensor is operative to sense an actual position of an accelerator pedal of the hybrid vehicle operable by the driver and to send, as data representing a request torque of the driver, the sensed actual position of the accelerator pedal to the microcomputer 50. The data representing a variable request torque will be referred to as "request torque data" hereinafter.

The microcomputer 50 is also connected to an RPM sensor 76 installed beforehand in the hybrid vehicle. The RPM sensor 76 is arranged to measure the RPM (revolutions per minute) of the motor-generator 2. The RPM sensor 76 is operative to send RPM data indicative of the RPM of the motor-generator to the microcomputer 50 as one of the motor state variables.

The switching elements 12, 14, 16, 18, 20, and 22 have control terminals, such as the gates, connected to the gate drivers 60, 62, 64, 66, 68, and 70, respectively. The gate drivers 60, 62, 64, 66, 68, and 70 are connected to the microcomputer 50, which allows the microcomputer 50 to individually control the gate drivers 60, 62, 64, 66, 68, and 70, thereby individually switching on and off the corresponding switching elements 12, 14, 16, 18, 20, and 22, respectively.

When the request torque data, the motor state variables, the instantaneous values of the U- and V-phase alternating currents, and/or the engine operating condition date are input thereto, the microcomputer 50 is operative to calculate, using the Kirchhoff's law, an instantaneous W-phase alternating current flowing through the W-phase winding based on the measured instantaneous U- and V-phase alternating current values.

Next, the microcomputer 50 is operative to cause the gate drivers 60, 62, 64, 66, 68, and 70 to individually turn on and off the switching elements 24, 26, 28, 30, 32, and 34, respectively, based on the actual rotation angle of the rotor 15, the U-, V-, and W-phase alternating currents, the voltage applied to the inverter 10, the request torque data, and the RPM data.

Figure 2:
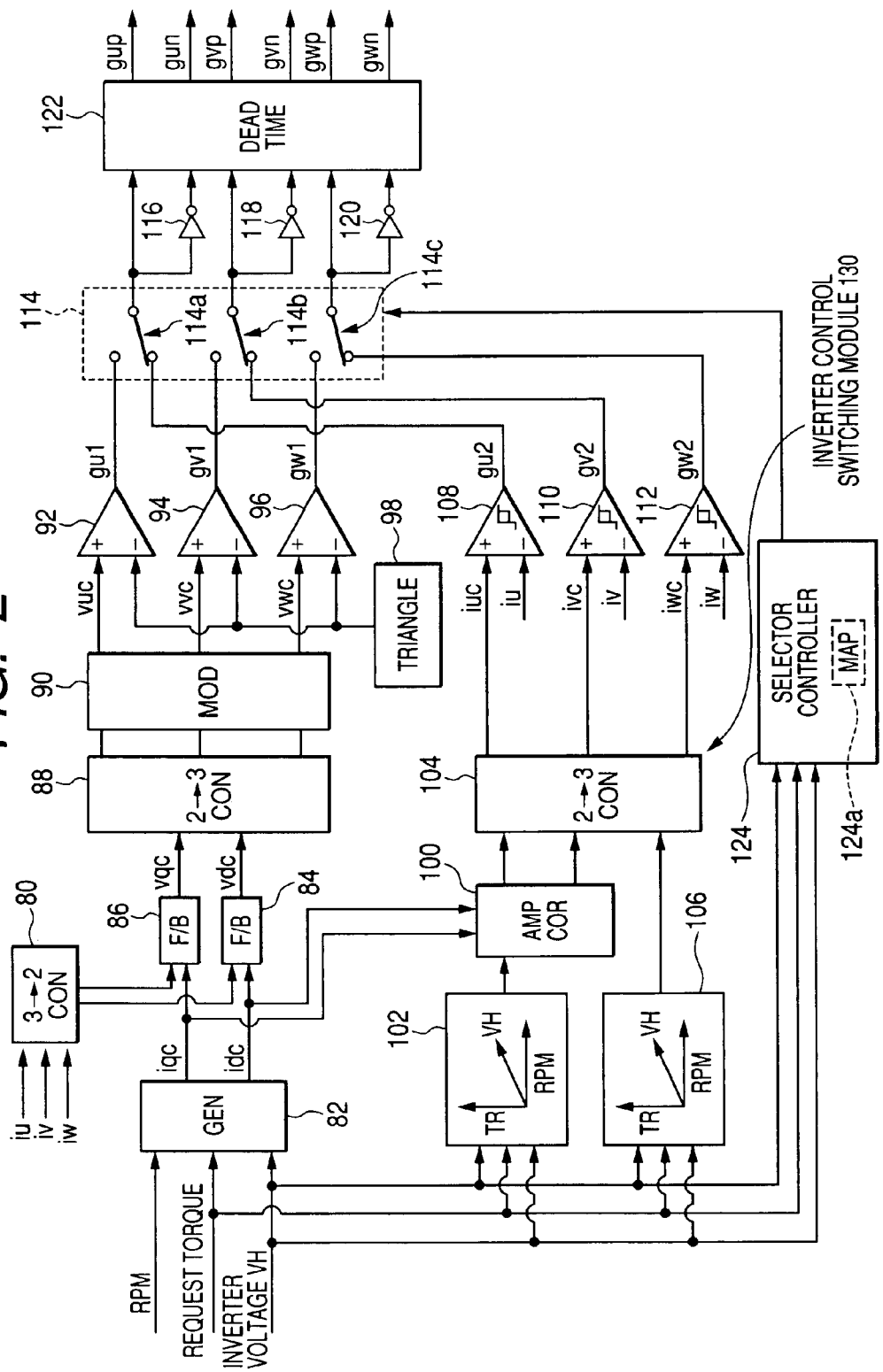
FIG. 2 is a block diagram schematically illustrating functional modules of a microcomputer equivalent to tasks to be executed thereby according to the embodiment.

FIG. 2 schematically illustrates functional modules of the microcomputer 50 equivalent to tasks to be executed thereby.

As illustrated in FIG. 2, the microcomputer 50 includes a three-phase to two-phase converter 80 (abbreviated as "3→2 CON 80" in FIG. 2). The three-phase to two-phase converter 80 works to convert the real instantaneous U-, V-, and W-phase alternating currents iu, iv, and iw in the stator coordinate system into D-axis component id and Q-axis current component iq in the D and Q axes of the rotor based on the measured rotational position θ passed to the converter 80.

The microcomputer 50 includes a command current generator 82 (abbreviated as "GEN 82" in FIG. 2).

The command current generator 82 generates command current D-axis component idc and Q-axis component iqc in the D and Q axes of the rotor based on the request torque data, the RPM data, and the voltage VH applied to the inverter 10. The command current D-axis component idc and Q-axis component iqc in the D and Q axes correspond to request three-phase currents in the D and Q axes; these request currents are required to generate the request torque.

The microcomputer 50 includes a feedback controller (F/B) 84 and a feedback controller (F/B) 86.

The feedback controller 84 works to calculate a deviation between the command D-axis component idc and the measured D-axis component id, and to generate a command voltage vdc that allows the command D-axis component idc to be matched with the measured D-axis component id.

Similarly, the feedback controller 86 works to calculate a deviation between the command Q-axis component iqc and the measured Q-axis component iq, and to generate a command voltage vqc that allows the command Q-axis component iqc to be matched with the measured Q-axis component iq.

The microcomputer 50 includes a two-phase to three-phase converter 88 (abbreviated as "2→3 CON 88" in FIG. 2).

The two-phase to three-phase converter 88 works to convert the command voltages vdc and vqc in the D-axis and Q-axis into fundamental line-to-line voltages between the three-phases based on the measured rotational position θ passed to the converter 88. These fundamental line-to-line voltages are assumed to be required to cause sinusoidal current waves to flow through the three-phase windings, respectively.

The microcomputer 50 includes a modulator (abbreviated as "MOD 90" in FIG. 2).

The modulator 90 works to modulate the fundamental line-to-line voltages under predetermined conditions to output a U-phase command voltage vuc, a V-phase command voltage vvc, and a W-phase command voltage vwc for the respective U-, V-, and W-phase windings. The U-, V-, and W-phase command voltages vuc, vvc, and vwc correspond to sinusoidal waves as signal waves, respectively.

The microcomputer 50 includes comparators 92, 94, and 96, and a triangle wave generator (abbreviated as "TRIANGLE 98" in FIG. 2).

The triangle wave generator 98 works to generate a carrier triangle wave.

The comparator 92 works to compare the U-phase command voltage vuc with the generated carrier triangle wave in amplitude to output a PWM U-phase signal (pulse signal) gu1 whose level is for example equivalent to:

a positive voltage level (+Vd) when the U-phase command voltage vuc is higher in amplitude than the generated carrier triangle wave; or a negative voltage level (−Vd) when the U-phase command voltage vuc is lower in amplitude than the generated carrier triangle wave.

Similarly, as illustrated in the graph (b) of FIG. 3 hereinafter, the comparator 94 works to compare the V-phase command voltage vvc with the generated carrier triangle wave in amplitude to output a PWM V-phase signal (pulse signal) gv1 whose level is for example equivalent to:

a positive voltage level (+Vd) when the V-phase command voltage vvc is higher in amplitude than the generated carrier triangle wave; or a negative voltage level (−Vd) when the V-phase command voltage vvc is lower in amplitude than the generated carrier triangle wave.

Furthermore, the comparator 96 works to compare the W-phase command voltage vwc with the generated carrier triangle wave in amplitude to output a PWM W-phase signal (pulse signal) gw1 whose level is for example equivalent to:

a positive voltage level (+Vd) when the W-phase command voltage vwc is higher in amplitude than the generated carrier triangle wave; or a negative voltage level (−Vd) when the W-phase command voltage vwc is lower in amplitude than the generated carrier triangle wave.

Specifically, the PWM U-, V-, and W-phase signals gu1, gv1, and gw1 by pulse-width modulating the U-, V-, and W-phase command voltages vuc, vvc, and vwc.

The microcomputer 50 includes an amplitude corrector 100 and an amplitude correcting map 102.

The amplitude corrector 100 works to receive the command current D-axis component idc and Q-axis component iqc passed from the command current generator 82 and to correct an amplitude of the command current D-axis component idc and that of the Q-axis component iqc based on the amplitude correcting map 102, the request torque data, the RPM data, and the voltage VH applied to the inverter 10.

The amplitude correcting map 102 is designed as a three-dimensional map composed of, for example, a data table and/or a program. The amplitude correcting map 102 represents a relationship between correcting amount variables of each of the command current D-axis component idc and the Q-axis component iqc, the request torque data (Tr), the RPM data, and the voltage VH applied to the inverter 10.

The amplitude corrector 100 works to determine a proper correcting amount of the amplitude of each of the command current D-axis component idc and the Q-axis component iqc by inputting the command torque data, the RPM data, and the voltage VH applied to the inverter 10 into the three-dimensional amplitude correcting map 102.

The microcomputer 50 includes a two-phase to three-phase converter 104 (abbreviated as "2→3 CON 104" in FIG. 2) and a phase correcting map 106.

The two-phase to three-phase converter 104 works to correct a phase of each of the command current D-axis component idc and the Q-axis component iqc whose amplitudes have been corrected based on the phase correcting map 106, the request torque data, the RPM data, and the voltage VH applied to the inverter 10.

The phase correcting map 106 is designed as a three-dimensional map composed of, for example, a data table and/or a program. The phase correcting map 106 represents a relationship between correcting amount variables of the phase of each of the command current D-axis component idc and the Q-axis component iqc, the request torque data (Tr), the RPM data, and the voltage VH applied to the inverter 10.

In addition to the phase correcting operations, the two-phase to three-phase converter 104 works to convert the command current D-axis component idc and the Q-axis component iqc whose amplitudes and phases have been corrected into a U-phase command current iuc, a V-phase command current ivc, and a W-phase command current iwc based on the measured rotational position θ passed to the converter 104.

The microcomputer 50 includes hysteresis comparators 108, 110, and 112 to which the U-phase command current iuc, V-phase command current ivc, and W-phase command current iwc are passed, respectively.

In addition, to the hysteresis comparators 108, 110, and 112, the instantaneous U-, V-, and W-phase alternating currents iu, iv, and iw, which will be referred to as "instantaneous currents iu, iv, and iw are passed.

Specifically, the hysteresis comparator 108 works to compare the instantaneous current iu in amplitude with the range between an upper limit of a predetermined hysteresis width of the U-phase command current iuc and a lower limit thereof to output an instantaneous-control output signal gu2 whose level is for example equivalent to:

a positive voltage level (logical high level) from when the instantaneous current value iu is lower than the lower limit of the predetermined hysteresis width of the U-phase command value iuc until when it is higher than the upper limit of the predetermined hysteresis width of the U-phase command value iuc; and a negative voltage level (logical low level) from when the instantaneous current value iu is higher than the upper limit of the predetermined hysteresis width of the U-phase command value iuc until when it is lower than the lower limit of the predetermined hysteresis width of the U-phase command value iuc.

Similarly, the hysteresis comparator 110 works to compare the instantaneous current iv in amplitude with the range between an upper limit of a predetermined hysteresis width of the V-phase command current ivc and a lower limit thereof to output an instantaneous-control output signal gv2 whose level is for example equivalent to:

a positive voltage level (logical high level) from when the instantaneous current value iv is lower than the lower limit of the predetermined hysteresis width of the V-phase command value ivc until when it is higher than the upper limit of the predetermined hysteresis width of the V-phase command value ivc; and a negative voltage level (logical low level) from when the instantaneous current value iv is higher than the upper limit of the predetermined hysteresis width of the V-phase command value ivc until when it is lower than the lower limit of the predetermined hysteresis width of the V-phase command value ivc.

Furthermore, the hysteresis comparator 112 works to compare the instantaneous current iw in amplitude with the range between an upper limit of a predetermined hysteresis width of the W-phase command current iwc and a lower limit thereof to output an instantaneous-control output signal gw2 whose level is for example equivalent to:

a positive voltage level (logical high level) from when the instantaneous current value iw is lower than the lower limit of the predetermined hysteresis width of the W-phase command value iwc until when it is higher than the upper limit of the predetermined hysteresis width of the W-phase command value iwc; and a negative voltage level (logical low level) from when the instantaneous current value iw is higher than the upper limit of the predetermined hysteresis width of the W-phase command value iwc until when it is lower than the lower limit of the predetermined hysteresis width of the W-phase command value iwc.

Note that the predetermined hysteresis width of a one-phase command current can prevent a hysteresis comparator from erroneously determining that a corresponding one instantaneous current is higher in amplitude than the phase command current due to noise being superimposed on the corresponding one instantaneous current.

The microcomputer 50 includes a selector 114, inverters 116, 118, and 120, and a dead time generator (abbreviated as "DEAD TIME 122" in FIG. 2).

The selector 114 has:

a first selecting module 114a to which the PWM U-phase signal gu1 and the instantaneous-control output signal gu2 are passed;

a second selecting module 114b to which the PWM V-phase signal gv1 and the instantaneous-control output signal gv2 are passed; and a third selecting module 114c to which the PWM W-phase signal gw1 and the instantaneous-control output signal gw2 are passed.

The first selecting module 114a works to select any one of the PWM U-phase signal gu1 and the instantaneous-control output signal gu2 and to output the selected signal as a section U-phase signal to the inverter 116 and the dead time generator 122.

The second selecting module 114b works to select any one of the PWM V-phase signal gv1 and the instantaneous-control output signal gv2 and to output the selected signal as a selection V-phase signal to the inverter 116 and the dead time generator 122.

The third selecting module 114c works to select any one of the PWM W-phase signal gw1 and the instantaneous-control output signal gw2 and to output the selected signal as a selection W-phase signal to the inverter 116 and the dead time generator 122.

The inverters 116, 118, and 120 work to invert the selection U-, V-, and W-phase signals, thereby outputting the inverted selection U-, V-, and W-phase signals to the dead time generator 122.

The dead time generator 122 works to carry out waveform shaping of the selection U-, V-, and W-phase signals and the corresponding inverted selection U-, V-, and W-phase signals. The waveform shaping operation allows an edge of each of the selection U-, V-, and W-phase signals and that of a corresponding one of the inverted selection U-, V-, and W-phase signals to be temporally separated from each other.

The dead time interval can therefore prevent each of the selection U-, V-, and W-phase signals and a corresponding one of the inverted selection U-, V-, and W-phase signals from being simultaneously applied to a corresponding pair of switching elements.

The waveform-shaped selection U-phase signal and the waveform-shaped inverted selection U-phase signal are used to drive the switching elements 12 and 14 of the first pair, respectively.

Similarly, the waveform-shaped selection V-phase signal and the waveform-shaped inverted selection V-phase signal are used to drive the switching elements 16 and 18 of the second pair, respectively.

Furthermore, the waveform-shaped selection W-phase signal and the waveform-shaped inverted selection W-phase signal are used to drive the switching elements 20 and 22 of the third pair, respectively.

The microcomputer 50 includes a selector controller 124 to which the request torque data, the RPM data, and the inverter input voltage VH are passed.

The selector controller 124 has stored therein an inverter control switching map 124a described hereinafter. The selector controller 124 works to switch control for the inverter 10 between a PWM control and an instantaneous current control based on the inverter control switching map 124a.

Specifically, the selector controller 124 works to cause the first selecting module 114a to select any one of the PWM U-phase signal gu1 and the instantaneous-control output signal gu2.

The selector controller 124 works to cause the first selecting module 114a to select any one of the PWM U-phase signal gu1 and the instantaneous-control output signal gu2.

The selector controller 124 also works to cause the second selecting module 114b to select any one of the PWM V-phase signal gv1 and the instantaneous-output control signal gv2.

Furthermore, the selector controller 124 works to cause the third selecting module 114c to select any one of the PWM W-phase signal gw1 and the instantaneous-control output signal gw2.

As described above, the configuration of the control system 3 can control a current, thereby setting it to a desired current.

Specifically, the PWM U-, V-, and W-phase signals gu1, gv1, and gw1 selected by the selector 104 allow the corresponding gate drivers 60, 62, 64, 66, 68, and 70 and the microcomputer 50 to perform PWM control, thereby turning on and off the corresponding switching elements 12, 14, 16, 18, 20, and 22. This can make the instantaneous current iu, iv, and iw follow request three-phase currents determined by the command current D-axis component idc and Q-axis component iqc.

During the PWM control, U-, V-, and W-phase voltages to be applied to the three-phase windings follow the command voltages vuc, vvc, and vwc. For this reason, the U-, V-, and W-phase voltages have a sinusoidal wave whose center of the peak to peak is zero.

In contrast, the instantaneous-control output signals gu2, gv2, and gw2 selected by the selector 104 allow the corresponding gate drivers 60, 62, 64, 66, 68, and 70 and the microcomputer 50 to perform an instantaneous current control. Specifically, the instantaneous current control makes it possible to turn on and off the switching elements 12, 14, 16, 18, 20, and 22 based on whether the instantaneous currents iu, iv, iw are respectively higher in amplitude than the command currents iuc, ivc, iwc. More properly, the instantaneous current control makes it possible to turn on and off the switching elements 12, 14, 16, 18, 20, and 22 based on whether the instantaneous currents iu, iv, iw are respectively within the range between the upper and lower limits of the hysteresis widths of the command currents iuc, ivc, iwc.

Note that, in the embodiment, the maps 102 and 106, the amplitude collector 100, the two-phase to three-phase converter 104, the selector 114, and the selector controller 124 serve as an inverter control switching module 130.

Next, switching of the PWM control and the instantaneous current control will be described hereinafter.

When the modulator 90 does not carry out the modulation, the sinusoidal waves (signal waves) are subjected to pulse width modulation so that the PWM output signals gu1, gv1, and gw1 are generated.

Figure 3:
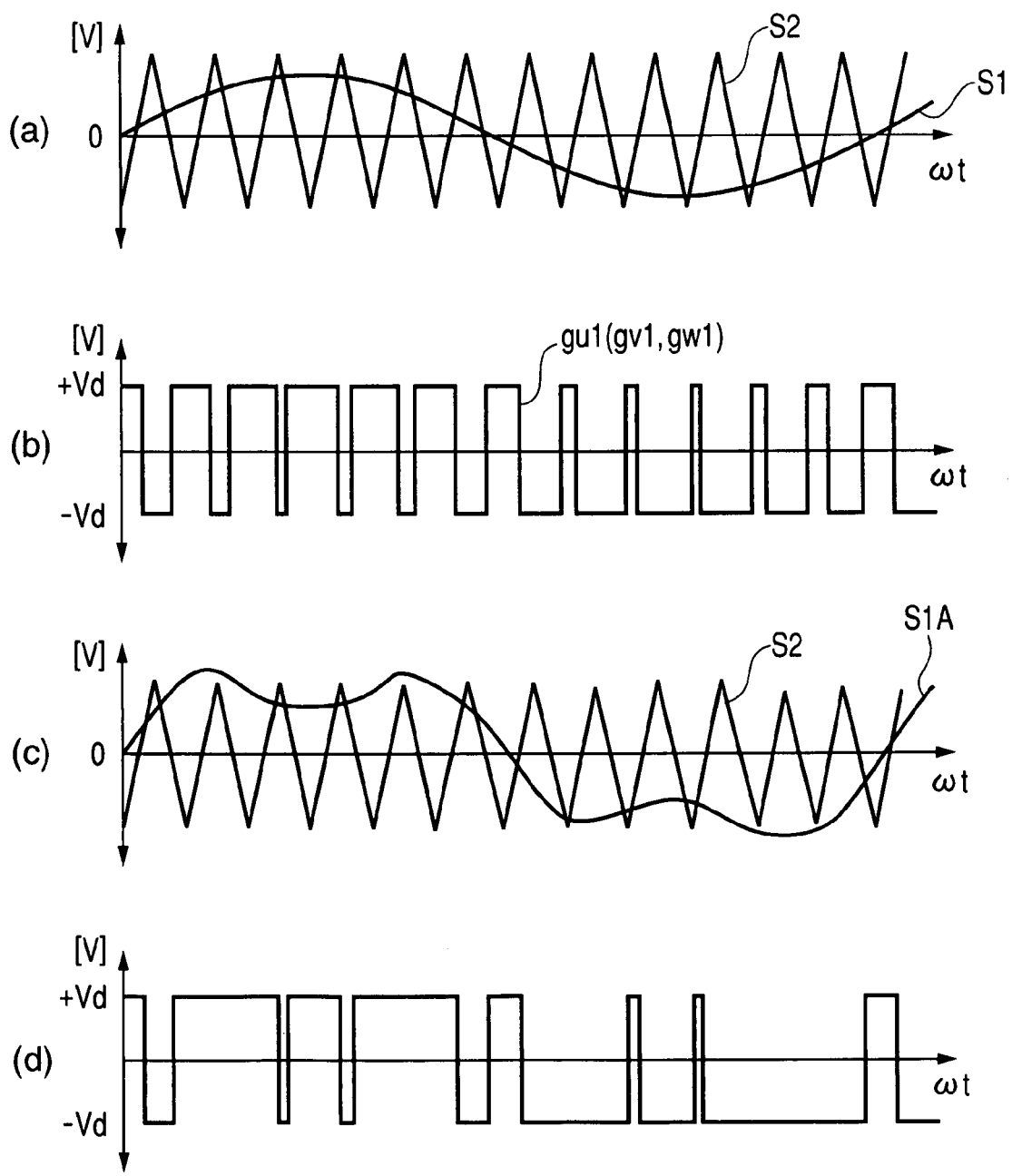
FIG. 3 schematically illustrates in graph how to generate one of PWM output signals according to the embodiment.

FIG. 3 schematically illustrate in graph how to generate one of the PWM output signals gu1, gv1, and gw1. In the graphs, the horizontal axis represents an angular velocity ωt, and the vertical axis represents a voltage [V (Volts)].

Specifically, in FIG. 3, the graph (a) illustrates a sinusoidal wave (signal wave) S1 corresponding to one of the command voltages vuc, vvc, and vwc input to one of the comparators 92, 94, and 96. The graph (a) also illustrates a carrier triangle wave S2 generated by the triangle wave generator 98 and input to one of the comparators 92, 94, and 96.

The graph (b) illustrates a corresponding one of the PWM output signals gu1, gv1, and gw1.

As illustrated in the graphs (a) and (b) in FIG. 3, a corresponding one of the PWM output signals gu1, gv1, and gw1 rises when the sinusoidal wave S1 is higher in amplitude than the carrier triangle wave S2. In contrast, a corresponding one of the PWM output signals gu1, gv1, and gw1 falls when the sinusoidal wave S1 is lower in amplitude than the carrier triangle wave S2.

Note that the amplitude of the triangle wave generated by the triangle wave generator 98 is set to be equivalent to a maximum input voltage of the inverter 10. Thus, when the positive peak of one of the command voltages vuc, vvc, and vwc exceeds the maximum input voltage of the inverter 10, it is difficult to generate a sinusoidal voltage to be applied to a corresponding one of the three-phase windings of the motor-generator 2.

Thus, the modulator 90 according to the embodiment works to address the problem.

Specifically, when the modulator 90 works to carry out the modulation, as illustrated in the graph (c) of FIG. 3, the sinusoidal wave S1 is modulated on, for example, a third harmonics thereof. Note that the graph (c) illustrates the modulated sinusoidal wave S1A corresponding to one of the command voltages vuc, vvc, and vwc input to one of the comparators 92, 94, and 96. The graph (c) also illustrates the carrier triangle wave S2 generated by the triangle wave generator 98 and input to one of the comparators 92, 94, and 96.

The graph (d) illustrates a corresponding one of the PWM output signals gu1, gv1, and gw1.

Note that the modulation by the modulator 90 is normally carried out when the RPM of the motor-generator 2 is comparatively high and/or the output torque thereof is comparatively high. This allows the voltage utilization factor to be improved even when the RPM of the motor-generator 2 is comparatively high and/or the output torque thereof is comparatively high. As described above, the voltage utilization factor can be calculated by dividing an RMS value of a line-to-line voltage of the motor-generator 2 by the input voltage of the inverter 10 measured by the voltage sensor 58.

Specifically, the maximum value of the voltage utilization factor when no modulation is carried out by the modulator 90 is probably on the order of 60 percent.

In contrast, modulation of the signal waves can probably increase the voltage utilization factor up to the order of 70 percent.

In order to increase the voltage utilization factor as much as possible, it is effective to carry out a single pulse control. During the single pulse control, an on duration of each of the switching elements 12 to 22 is substantially equivalent to a half cycle of a request current wave to flow through each phase winding of the motor-generator 2; this request current wave is required to generate a request torque. This probably permits the voltage utilization factor to increase up to an approximately 78 percent.

FIG. 4 schematically illustrates a relationship between the RPM of the motor-generator 2 and a variable request torque [N·m]. FIG. 4 shows a dashed boundary line BL represents a line in which power loss caused by the PWM control and that caused by the single pulse control are matched with each other.

As illustrated in FIG. 4, the power loss caused by the PWM control is higher than that caused by the single pulse control at a high output-torque and RPM region R1 from the boundary line BL.

In contrast, the power loss caused by the single pulse control is higher than that caused by the PWM pulse control at a low output-torque and RPM region R2 from the boundary line BL.

Thus, it is preferable to carry out the PWM control at the low output-torque and RPM region R2 from the boundary line BL and carry out the single pulse control at the high output-torque and RPM region R1 from the boundary line BL.

When the output torque and/or the RPM of the motor-generator 2 is increased, use of the modulator 90 permits the voltage utilization factor to theoretically increase up to an approximately 78 percent.

However, generation of the dead time intervals by the dead time generator 122 causes the voltage utilization factor to probably peak out at an approximately 75 percent.

Specifically, when the output torque and/or the RPM of the motor-generator 2 is increased toward the boundary line BL, execution of the PWM control using the modulator 90 in order to improve the voltage utilization factor probably causes the pulse width of each of the PWM U-, V-, and W-phase signals gu1, gv1, and gw1 to narrow with increase of the output torque and/or the RPM of the motor-generator 2.

If the pulse width of each of the signals gu1, gv1, and gw1 narrows up to a level that causes each of the signals gu1, gv1, and gw1 to disappear due to generation of the dead time interval, the voltage utilization factor cannot be improved more than a value obtained when the pulse width of each of the signals gu1, gv1, and gw1 narrows up to the level. The value of the voltage utilization factor is probably equivalent to 75 percent or thereabout.

For this reason, when the control of the microcomputer 50 is shifted from the PWM control mode to the single pulse control mode, the voltage utilization factor intermittently changes. This may cause the output torque generated by the motor-generator 2 to intermittently change, subjecting at least one occupant to a shock (torque shock).

Accordingly, in the embodiment, the microcomputer 50 is operative to shift from the PWM control to the instantaneous current control within the low output-torque and RPM region R2 from the boundary line BL. The instantaneous current control allows multi-pulse control to be shifted to the single pulse control.

Specifically, the multi-pulse control based on the instantaneous-control output signals gu2, gv2, and gw2 is designed to generate a plurality of pulses for drive of each of the switching elements 12 to 22 every one cycle of the request three-phase currents flowing through the three-phase windings of the motor-generator 2.

FIG. 5 schematically illustrates a relationship between the RPM of the motor-generator 2 and a variable request torque [N·m] obtained by shifting the PWM control to the instantaneous current control at a proper timing according to the embodiment. In other words, the amplitude and phase correcting maps 102 and 106 substantially represent the relationship illustrated in FIG. 5.

As set forth above, the inverter switching map 124*a* represents the relationship illustrated in FIG. 5.

Specifically, FIG. 5 specifically illustrates a PWM control region R5 and an instantaneous current control region R10.

As illustrated in FIGS. 2 and 5, the selector controller 124 is operative to select the PWM control (select the PWM three-phase signals gu1, gv1, and gw1) while a point representing a relationship between the input request torque data, the RPM data, and the inverter input voltage VH belongs to the PWM control region R5. The PWM control region R5 is located to be lower in output-torque and RPM than the boundary line BL.

In the PWM control region R5, a curve C that the maximum value of the output torque and the RPM of the motor-generator 2 delineates represents a curve in which the output torque and the RPM of the motor-generator 2 becomes minimum within a region in which the voltage utilization factor based on the PWM control is maximized.

In other words, the curve C that the maximum value of the output torque and the RPM of the motor-generator 2 delineates represents a critical line in which a counter-electromagnetic force induced in the motor-generator 2, a terminal voltage of the motor-generator 2 determined by the command current D-axis component idc and Q-axis component iqc, and an output voltage of the inverter 10 are matched with each other.

Figure 6:
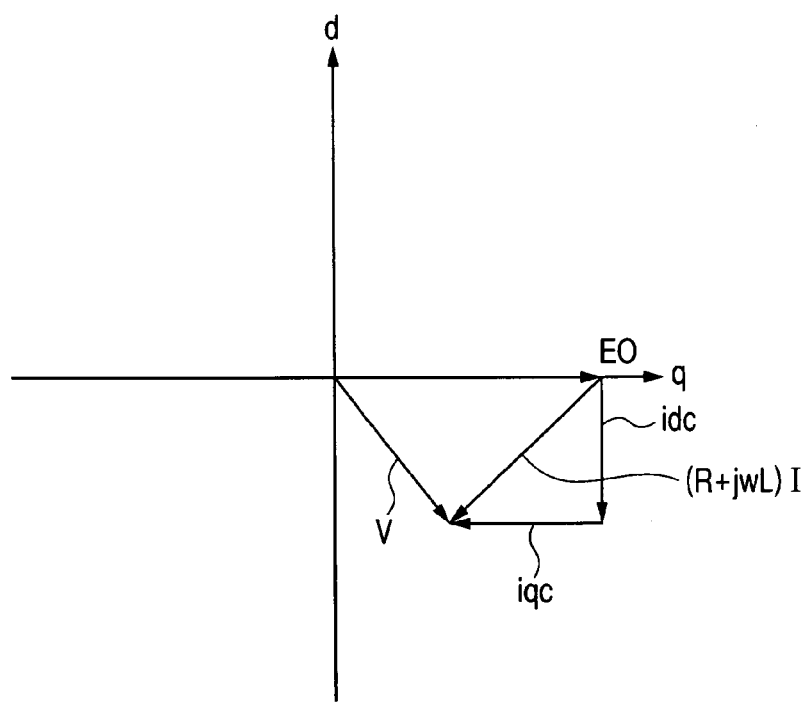
FIG. 6 is a vector diagram schematically illustrating a terminal voltage vector of the motor-generator according to the embodiment.

Specifically, illustrated in FIG. 6, the terminal voltage vector V of the motor-generator 2 can be given by the sum of the counter-electromagnetic force vector EO and a voltage component vector given by "(R+jωL)I". ω represents an angular speed of the rotor, a vector I represents the sum of the command current vector idc and iqc, and L represents an inductance of the vector I.

Note that the output voltage of the inverter 10 represents a voltage value that the command voltages vdc and vqc try to apply to the motor-generator 2 as the terminal voltage.

In addition, as illustrated in FIGS. 2 and 5, the selector controller 124 is operative to switch from the PWM control to the instantaneous current control using the multi-pulse control (select the instantaneous-control output voltages gu2, gv2, and gw2) when a point determined by representing a relationship between the input request torque data, the RPM data, and the inverter input voltage VH belongs to a multi-pulse region R11 in the instantaneous current control region R10; this multi-pulse region R11 is located to be lower in output-torque and RPM than the boundary line BL and higher in output-torque and RPM than the curve C.

In other words, the selector controller 124 is operative to switch from the PWM control to the instantaneous current control using the multi-pulse control (select the instantaneous-control output voltages gu2, gv2, and gw2) before the voltage utilization factor becomes maximum.

Moreover, as illustrated in FIGS. 2 and 5, the amplitude collector 100 and the two-phase to three-phase converter 104 are operative to switch from the multi-pulse control of the instantaneous current control to the single pulse control while a point representing a relationship between the input request torque data, the RPM data, and the inverter input voltage VH belongs to a single-pulse region R12 in the instantaneous current control region R10; this single-pulse region R12 is located to be higher in output-torque and RPM than the boundary line BL.

The switching of control of the inverter 10 allows the voltage utilization factor of the motor-generator 2 to be continuously changed up to a value obtained by the single pulse control of the instantaneous current control.

In addition, it is possible to switch from the PWM control to the instantaneous current control before the voltage utilization factor of the motor-generator 2 reaches its maximum value under the PWM control.

Specifically, if the PWM control is continuously carried out when a point representing a relationship between the input request torque data, the RPM data, and the inverter input voltage VH is located to be higher in output-torque and RPM than the curve C, the voltage utilization factor may peak out.

In contrast, switching from the PWM control to the instantaneous current control before the voltage utilization factor reaches its maximum value allows the voltage utilization factor to gradually rise up to the boundary line BL with increase of the output torque and the RPM of the motor-generator 2.

Note that switching from the instantaneous current control to the PWM control is preferably carried out when a point representing a relationship between the input request torque data, the RPM data, and the inverter input voltage VH is located to be lower in output-torque and RPM than the boundary line BL.

Specifically, when a point representing a relationship between the input request torque data, the RPM data, and the inverter input voltage VH is located to be lower in output-torque and RPM than a hysteresis region, it is possible to switch from the instantaneous current control to the PWM control. This allows frequent switching between the PWM control and the instantaneous current control to be reduced. In addition, the PWM control and instantaneous current control durations are set to be longer than a control stability time, making it possible to stabilizes each of the PWM control and instantaneous current control.

Next, operations required to shift from the multi-pulse control to the single pulse control in the instantaneous current control will be described hereinafter.

In the embodiment, when converting the command currents iqc and idc into three-phase currents, the two-phase to three-phase converter 104 corrects the amplitude and the phase of each of the command currents iqc and idc, thereby generating the command currents iuc, ivc, and iwc that allow the single pulse control to be carried out.

Figure 7:
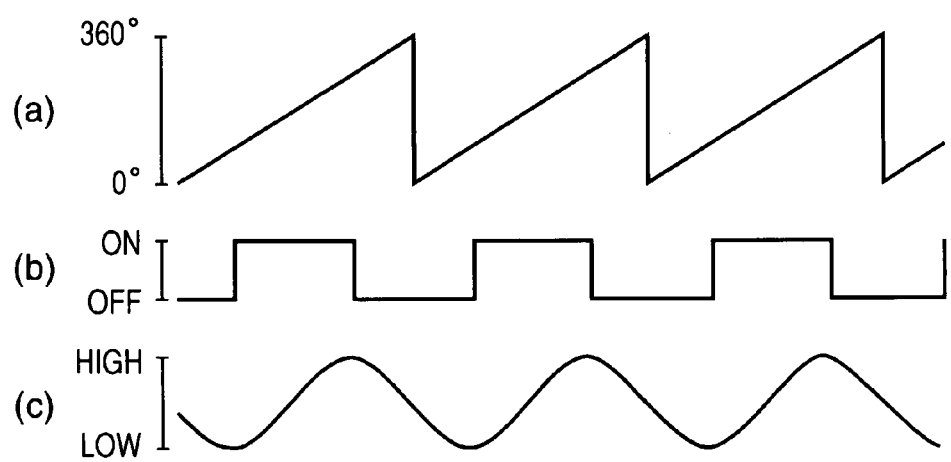
FIG. 7 is a view schematically illustrating in graph an example of conventional single pulse control methods.

FIG. 7 schematically illustrates an example of conventional single pulse control methods. Specifically, the graph (a) illustrated in FIG. 7 shows the shift of the rotational angle of the rotor of the motor-generator 2 over time. The graph (b) shows a drive pulse signal used for the single pulse control, whose pulse width of each pulse corresponds to a half cycle of a request current wave for each of the three-phase windings, and the graph (c) shows the request current wave flowing through each of the three-phase windings.

In the single pulse control, the pulse signal is so generated as to turn on each of the switching elements 12 to 22 synchronized when the rotor of the motor-generator 2 is rotated by 180 degrees from a predetermined angle. Specifically, no feedback control is carried out based on a command current actually flowing through each of the three-phase windings of the motor-generator 2.

In contrast, in the embodiment, the amplitude corrector 100 and the two-phase to three-phase converter 104 are operative to adjust the amplitude and the phase of each of the command current D-axis component idc and Q-axis component iqc during feedback control based on the measured instantaneous currents, thereby generating a pulse signal that is the same as the pulse used by the single pulse control.

Specifically, the amplitude corrector 100 and the two-phase to three-phase converter 104 are operative to adjust the amplitude and phase of each of the command current D-axis component idc and Q-axis component iqc such that:

the three-phase request currents, which are obtained by converting the command current D-axis component idc and Q-axis component iqc, and the three-phase command currents iuc, ivc, iwc, intersect with each other at a timing IP2 corresponding to a rising edge of the pulse signal used for the single pulse control and at another timing corresponding to a falling edge IP1 of the pulse signal used for the single pulse control.

Figure 8:
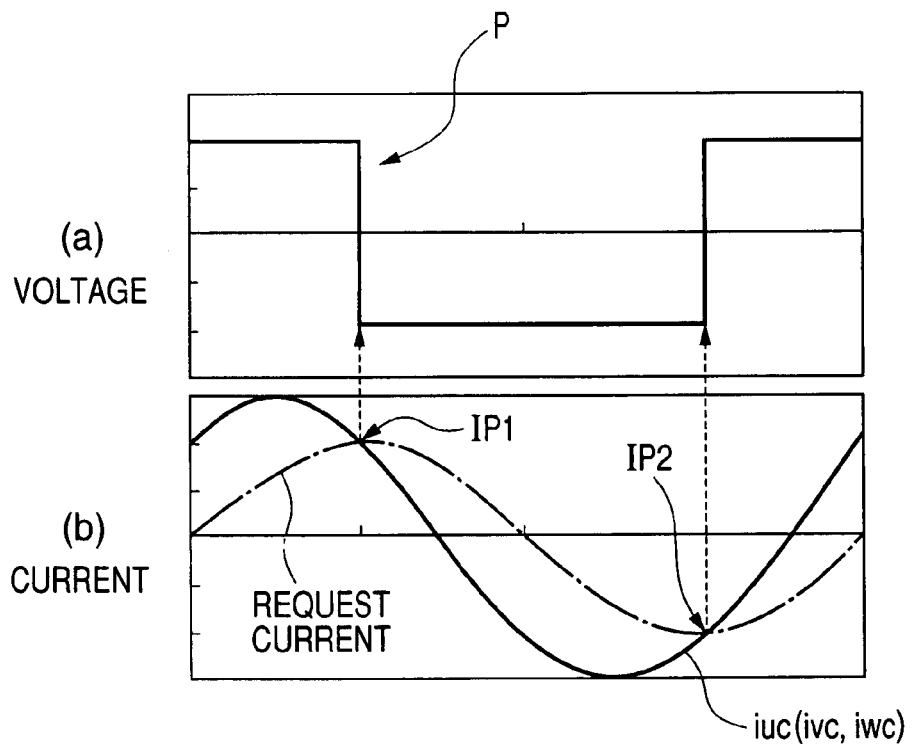
FIG. 8 is a view schematically illustrating a graph (a) showing a drive pulse signal used for the single pulse control, and a graph (b) schematically showing one of three-phase command currents.
Figure 9:
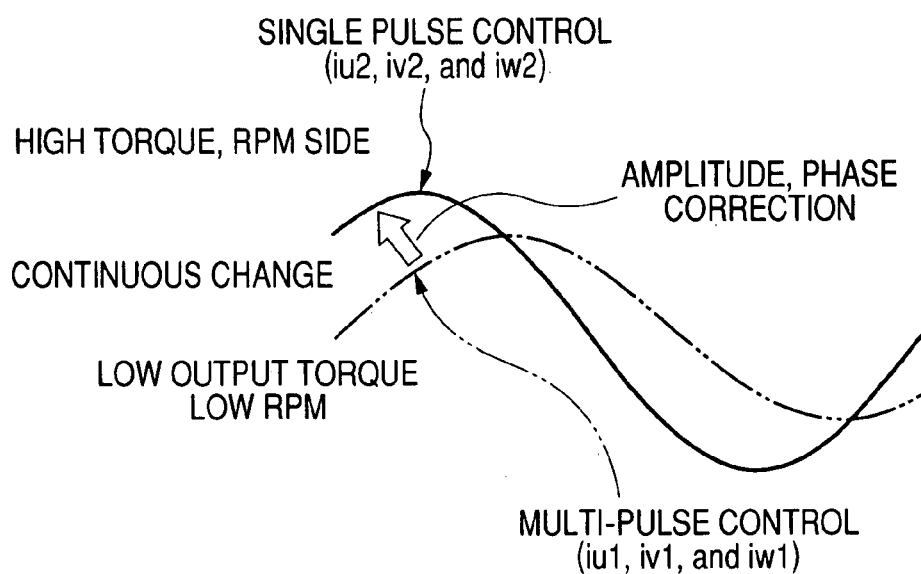
FIG. 9 is a view schematically illustrating shift of a multiphase control to a single pulse control.

FIG. 8 illustrates a graph (a) schematically showing the drive pulse signal P used for the single pulse control. FIG. 8 also illustrates a graph (b) schematically showing one of the three-phase command currents iuc, ivc, iwc in solid line and showing a corresponding one of the request three-phase currents in dashed line.

As illustrated in the graphs (a) and (b) of FIG. 8, application of the three-phase command currents iuc, ivc, and iwc to the hysteresis comparators 108, 110, and 112, respectively, allows the instantaneous-control output signals gu2, gv2, and gw2 to become the drive pulse signals used for the single pulse control. The reasons will be described as follows.

For example, it is assumed that one of the instantaneous currents iu, iv, and iw are equivalent to a corresponding one of the request currents.

When amplitude correlations between one of the instantaneous currents iu, iv, and iw and a corresponding one of the three-phase command currents iuc, ivc, and iwc before and after each of the intersecting timings IP1 and IP2 are reversed. After each of the intersecting timings IP1 and IP2, the amplitude difference between one of the instantaneous currents iu, iv, and iw and a corresponding one of the three-phase command currents iuc, ivc, and iwc increases over time.

Thus, a large amplitude of each of the three-phase command currents iuc, ivc, and iwc allows a corresponding one of the instantaneous-control output signals gu2, gv2, and gw2 to be reversed around each of the intersecting timings IP1 and IP2 with little influence of the hysteresis width of each of the three-phase command currents iuc, ivc, and iwc.

Specifically, in order to shift from the multi-pulse control to the single pulse control in the instantaneous current control, the amplitude corrector 100 and the two-phase to three-phase converter 104 are operative to output real three-phase command currents iuc1, ivc1, and iwc1 immediately after switching of inverter control from the PWM control to the instantaneous control, thereby carrying out the multi-pulse control.

Thereafter, the amplitude corrector 100 and the two-phase to three-phase converter 104 are operative to continuously change the three-phase command currents by adjusting their amplitude and phase depending on shift of a point representing a relationship between the input request torque data, the RPM data, and the inverter input voltage VH toward the high output torque side and the high RPM side.

Especially, when a point representing a relationship between the input request torque data, the RPM data, and the inverter input voltage VH is located to be higher in output-torque and RPM than the boundary line BL, the amplitude corrector 100 and the two-phase to three-phase converter 104 are operative to set the three-phase command currents to three-phase command currents iuc2, ivc2, and iwc2 intersecting with the three-phase request currents.

This allows the voltage utilization factor to continuously increase with the shift of a point representing a relationship between the input request torque data, the RPM data, and the inverter input voltage VH toward the high output torque side and the high RPM side.

In addition, when a point representing a relationship between the input request torque data, the RPM data, and the inverter input voltage VH is located to be higher in output-torque and RPM than the boundary line BL, it is possible to carry out the single pulse control, thereby maintaining the voltage utilization factor at a high level.

As described above, the control system 3 according to the embodiment is configured to drive the switching elements 12 to 22 such that the voltage utilization factor is continuously changed with change in at least one of the RPM and the output torque of the motor-generator 2. This makes it possible to effectively reduce torque shock.

The control system 3 according to the embodiment is configured to shift from the multi-pulse mode to single pulse control, thereby realizing continuous change in the voltage utilization factor. This allows the voltage utilization factor to be continuously changed up to a value obtained by the single pulse control.

The control system 3 according to the embodiment is configured to, when at least one of the RPM and the output torque of the motor-generator 2 is equal to or greater than a predetermined value, switching from the PWM control to the instantaneous current control. This allows control of the inverter 10 to be shifted from the PWM control to the instantaneous current control before power loss based on the PWM control increases, making it possible to reduce power loss.

The control system 3 is configured to switch from the PWM control to the instantaneous current control within the low output-torque and RPM region R2 from the boundary line BL. When a point representing a relationship between the input request torque data, the RPM data, and the inverter input voltage VH is located to be higher in output-torque and RPM than the boundary line BL, it is possible to reliably carry out the single pulse control. This can use the single pulse control with high voltage utilization factor as much as possible, making it possible to improve the voltage utilization factor.

The control system 3 is configured to switch from the PWM control to the instantaneous current control before the voltage utilization factor becomes maximum. This makes it possible to, after the switching, improve the voltage utilization factor up to the boundary line BL with increase of the output torque and the RPM of the motor-generator 2.

The control system 3 is configured to switch from the control to make the instantaneous currents iu, iv, and iw follow the three-phase command currents iuc, ivc, and iwc to that to make the three-phase command currents iuc2, ivc2, and iwc2 intersect with the three-phase request currents. This allows the voltage utilization factor to continuously rise.

Correction of the amplitude and phase of three-phase command currents used by the PWM control can generate three-phase command currents used by the instantaneous current control. This makes it possible to easily generate the three-phase command currents used by the instantaneous current control.

In the embodiment, the modulator 90 can be omitted. In this configuration, it is preferable to switch from the PWM control to the instantaneous current control before the voltage utilization factor based on the PWM control becomes maximum. This makes it possible to improve the voltage utilization factor.

As the carrier wave, another cyclic wave can be used. In addition, there is no need to carry out the instantaneous current control when a point representing a relationship between the input request torque data, the RPM data, and the inverter input voltage VH belongs to the instantaneous current control region R10.

After the command currents iqc and idc are converted into three-phase currents, the amplitude and phase of the three-phase currents can be corrected. In this case, as the map 102 and/or 106, a three-dimensional map that represents a relationship between correcting amount variables of each of the three-phase command currents iuc, ivc, and iwc, the request torque data, the RPM data, and the voltage VH applied to the inverter 10 can be used.

As the parameters for switching of the PWM control to the instantaneous current control, in place of the request torque data, command current data indicative of three-phase command currents can be used. In this case, when at least one of the three-phase command currents and the RPM is equal to or greater than a predetermined value, it is possible to switch inverter control from the PWM control to the instantaneous current control.

The motor-generator 2 can serve as a generator. In this case, as the torque request illustrated in FIG. 5, a negative torque request can be used.

The control system 3 can be installed in various types of vehicle, such as an electric automobile.

While there has been described what is at present considered to be the embodiment and its modifications of the present invention, it will be understood that various modifications which are not described yet may be made therein, and it is intended to cover in the appended claims all such modifications as fall within the true spirit and scope of the invention.

What is claimed is:

1. A control system for controlling an on duration of a switching element to which a direct current voltage is applied, thereby generating a cyclic current to be supplied to a multiphase rotary electric machine, the cyclic current allowing a portion of the multiphase rotary electric machine to rotate, the control system comprising:
    a storing unit configured to store a relationship between a workload associated with rotation of the portion of the multiphase rotary electric machine and a voltage utilization factor of the multiphase rotary electric machine, the voltage utilization factor including information representing how percentage the direct current voltage applied to the switching element is used by the multiphase rotary electric machine;
    a measuring unit configured to measure change in the workload associated with rotation of the multiphase rotary electric machine; and
    a pulse control unit configured to carry out a single pulse control to change the on duration of the switching element to be substantially equivalent to a half cycle of the cyclic current while continuously changing the voltage utilization factor based on the relationship stored in the storing unit and the measured change of the workload.

2. A control system according to claim 1, wherein the pulse control unit includes:
    a setting unit configured to set a first command current value for the cyclic current;
    a measuring unit configured to measure an instantaneous current value based on the cyclic current flowing in the multiphase rotary electric machine; and
    an instantaneous control unit configured to
        carry out a multi-pulse control to generate a plurality of drive pulses based on a difference between the first command current value and the measured instantaneous current value within one cycle of the cyclic current, each of the drive pulses allowing the switching element to be turned on; and
        shift the multi-pulse control to the single pulse control while continuously changing the voltage utilization factor based on the relationship stored in the storing unit and the measured change of the workload.

3. A control system according to claim 2, wherein the pulse control unit includes:
    a PWM control unit configured to carry out a PWM control to:
        compare a signal wave with a predetermined carrier wave, the signal wave being required to control the cyclic current to be set to the first command current value; and
        generate a plurality of drive pulses based on a comparison result of the signal wave and the carrier wave within one cycle of the cyclic current, each of the drive pulses allowing the switching element to be turned on; and
    a switching unit operatively connected to the instantaneous control unit and the PWM control unit and configured to, when the measured workload is equal to or more than a predetermined value during execution of the PWM control by the PWM control unit, switch from the PWM control to the multi-pulse control.

4. A control system according to claim 3, wherein the relationship includes a boundary line in which power loss caused by the PWM control and power loss caused by the single pulse control are matched with each other, the boundary line being associated with the workload, and the switching unit is configured to switch from the PWM control to the multi-pulse control when the measured workload is lower than the boundary line.

5. A control system according to claim 3, wherein the switching unit is configured to switch from the PWM control to the multi-pulse control before the measured workload reaches a region in which the voltage utilization factor is maximized.

6. A control system according to claim 2, wherein the first command current value for the cyclic current corresponds to a request cyclic current required for the multiphase rotary electric machine to generate a request torque, and the instantaneous control unit further includes a shift unit configured to shift the first command current value to a second cyclic current depending on increase of the measured workload, the second cyclic current having an amplitude higher than an amplitude of the request cyclic current and a period identical to a period of the request cyclic current.

7. A control system according to claim 6, wherein the shift unit is configured to increase the amplitude of the first command current value depending on increase of the measured workload, thereby generating the second cyclic current.

8. A control system for controlling an on duration of a switching element to which a direct current voltage is applied, thereby generating a cyclic current to be supplied to a multiphase rotary electric machine, the cyclic current allowing a portion of the multiphase rotary electric machine to rotate, the control system comprising:
    a storing unit configured to store a relationship between a workload associated with rotation of the multiphase rotary electric machine and a voltage utilization factor of the multiphase rotary electric machine, the voltage utilization factor including information representing how percentage the direct current voltage applied to the switching element is used by the multiphase rotary electric machine;

a measuring unit configured to measure change in the workload associated with rotation of the portion of the multiphase rotary electric machine;

a setting unit configured to set a first command current value for the cyclic current;

a measuring unit configured to measure an instantaneous current value based on the cyclic current flowing in the multiphase rotary electric machine;

an instantaneous control unit configured to
carry out a multi-pulse control to generate a plurality of drive pulses based on a difference between the first command current value and the measured instantaneous current value within one cycle of the cyclic current, each of the drive pulses allowing the switching element to be turned on;

a PWM control unit configured to carry out a PWM control to:
compare a signal wave with a predetermined carrier wave, the signal wave being required to control the cyclic current to be set to the command current value; and
generate a plurality of drive pulses based on a comparison result of the signal wave and the carrier wave within one cycle of the cyclic current, each of the drive pulses allowing the switching element to be turned on; and a switching unit operatively connected to the instantaneous control unit and the PWM control unit and configured to, when the measured workload is equal to or more than a predetermined value during execution of the PWM control by the PWM control unit, switch from the PWM control to the multi-pulse control.

9. A control system according to claim 8, wherein the first command current value for the cyclic current corresponds to a request cyclic current required for the multiphase rotary electric machine to generate a request torque, and the instantaneous control unit further includes a shift unit configured to shift the first command current value to a second cyclic current depending on increase of the measured workload, the second cyclic current having an amplitude higher than an amplitude of the request cyclic current and a period identical to a period of the request cyclic current.

10. A control system according to claim 9, wherein the shift unit is configured to increase the amplitude of the first command current value depending on increase of the measured workload, thereby generating the second cyclic current.

* * * * *